(12) United States Patent
Shibata (10) Patent No.: US 11,472,489 B2
(45) Date of Patent: Oct. 18, 2022

(54) MOUNTING STRUCTURE OF VEHICLE-USE DETECTION SENSOR AND BRACKET

(71) Applicant: TOYOTA JIDOSHA KABUSHIKI KAISHA, Toyota (JP)

(72) Inventor: Kensaku Shibata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 152 days.

(21) Appl. No.: 17/156,867

(22) Filed: Jan. 25, 2021

(65) Prior Publication Data

US 2021/0229754 A1 Jul. 29, 2021

(30) Foreign Application Priority Data

Jan. 27, 2020 (JP) ................. JP2020-11028

(51) Int. Cl.
*B62D 25/18* (2006.01)
*B60R 11/00* (2006.01)

(52) U.S. Cl.
CPC .............. *B62D 25/18* (2013.01); *B60R 11/00* (2013.01); *B60R 2011/004* (2013.01)

(58) Field of Classification Search
CPC ... B62D 25/18; B60R 11/00; B60R 2011/004; B60R 2011/0042
USPC ........................................................ 296/198
See application file for complete search history.

(56) References Cited

U.S. PATENT DOCUMENTS

| | | | | |
|---|---|---|---|---|
| 10,073,178 | B2 * | 9/2018 | Hara ..................... | G01S 7/4813 |
| 2016/0291151 | A1 * | 10/2016 | Dechoux ............... | B60R 19/483 |
| 2017/0297521 | A1 | 10/2017 | Sugie et al. | |
| 2020/0156576 | A1 * | 5/2020 | Kataoka ................ | B62D 25/16 |
| 2021/0031701 | A1 * | 2/2021 | Kitagawa ............... | G01S 13/931 |
| 2021/0362646 | A1 * | 11/2021 | Drueppel ............... | B60R 11/00 |

FOREIGN PATENT DOCUMENTS

| | | |
|---|---|---|
| JP | 2017193223 A | 10/2017 |
| JP | 2020082922 A | 6/2020 |
| JP | 2020082923 A | 6/2020 |

* cited by examiner

*Primary Examiner* — Pinel E Romain
(74) *Attorney, Agent, or Firm* — Dickinson Wright, PLLC (57) ABSTRACT

A mounting structure of a vehicle-use detection sensor comprises a fender panel 10, an inner panel 18 placed on a vehicle inward side with respect to the panel 10, a detection sensor 14 placed in a space between the panels 10 and 18, and a bracket 20 placed in the above-mentioned space, holding the sensor 14, and fixed to the panel 10. The bracket 20 comprises a first wall part 22 including a surface 22*a* fixed to the panel 10, a second wall part 24 placed on the vehicle inward side with respect to the wall part 22 and including a surface 24*b* opposing the panel 18, and a connection part 26 connecting the wall parts 22 and 24. The wall part 24 comprises recessed parts 40, 42 on vehicle front and rear sides thereof, respectively, each of which being recessed from the surface 24*b* toward a vehicle outward direction.

5 Claims, 11 Drawing Sheets

MOUNTING STRUCTURE OF VEHICLE-USE DETECTION SENSOR AND BRACKET

TECHNICAL FIELD

The present invention relates to a mounting structure of a vehicle-use detection sensor for detecting surrounding information and a bracket for holding the detection sensor.

BACKGROUND ART

A vehicle mounted with a detection sensor comprising a detection part for detecting surrounding information has been conventionally known.

For example, Japanese Patent Application Laid-Open (kokai) No. 2017-193223 discloses a structure where a detection sensor is fixed to a surface on a vehicle inward side of a fender panel (a panel constituting a part of a lateral surface of a vehicle body). The fender panel has a portion opposing a detection part of the detection sensor. This portion is formed of a material which allows light or sound used for detection to transmit/pass, and thereby the detection sensor detects information on a lateral side of a vehicle.

SUMMARY OF THE INVENTION

When fixing a detection sensor to a fender panel, normally, fix the detection sensor to a bracket in advance, and then fix this bracket to a surface on a vehicle inward side of the fender panel. That is, the detection sensor is fixed to the fender panel in an indirect manner. This fixing work is conducted after a vehicle body is assembled to some extent. Therefore, at a timing when the fixing work is conducted, an inner panel has been placed in a vicinity of the fender panel such that the inner panel opposes this fender panel. Hence, a worker is required to do the fixing work so as not to interfere with the inner panel. However, a distance between the fender panel and the inner panel is relatively short and a space formed therebetween is relatively small, which has made the fixing work difficult to do (for example, a hand holding the bracket interferes with the inner panel).

The present invention is made to resolve the problem above. That is, one of objects of the present invention is to enhance workability of fixing a bracket to which a detection sensor has been fixed to a fender panel.

A mounting structure of a vehicle-use detection sensor (hereinafter, referred to as a "present invention structure") according to the present invention comprises:

a fender panel (10) constituting a part of a lateral surface of a vehicle body;

an inner panel (18) placed on a vehicle inward side with respect to the fender panel (10) in such a manner that the inner panel (18) opposes the fender panel (10);

a detection sensor (14) placed in a space (S) formed on the vehicle inward side with respect to the fender panel (10) as well as on a vehicle outward side with respect to the inner panel (18) and comprising a detection part (14a) capable of detecting surrounding information, the detection part (14a) being exposed to a vehicle lateral side via an opening part (12a) provided at the fender panel (10); and a bracket (20) placed in the space (S), holding the detection sensor (14), and fixed to the fender panel (10).

The bracket (20) comprises:

a first wall part (22) including a fender-panel-fixed-surface (22a) on the vehicle outward side thereof, the fender-panel-fixed-surface (22a) being to be fixed to the fender panel (10), and including an opening part (22b) for exposing the detection part (14a) of the detection sensor (14) to the vehicle lateral side;

a second wall part (24) placed on the vehicle inward side with respect to the first wall part (22) in such a manner that the second wall part (24) opposes the first wall part (22), covering a surface (14d) on the vehicle inward side of the detection sensor (14), including a detection-sensor-fixed-surface (24a), the detection sensor (14) being to be fixed thereto, on the vehicle outward side thereof, and including an inner-panel-opposing-surface (24b) opposing the inner panel (18) on the vehicle inward side thereof; and a connection part (26) connecting the first wall part (22) and the second wall part (24), and the second wall part (24) comprises a recessed part (40 or 42) on a vehicle front side thereof and a recessed part (42 or 40) on a vehicle rear side thereof, each of which being recessed from the inner-panel-opposing-surface (24b) toward a vehicle outward direction.

According to the bracket of the present invention structure, a worker, for example, inserts his/her thumb into one of these recessed parts (typically, a recessed part to be positioned on the vehicle front side after fixing work) and supports a lower part of the bracket with the remaining fingers, and thereby can hold the bracket. Thus, compared to a way of holding the bracket where the worker puts his/her thumb on the first wall part, puts the remaining fingers on the second wall part, and hold the bracket by sandwiching the bracket, a worker's hand comes to hardly interfere with the inner panel when conducting the fixing work. Hence, workability when conducting the fixing work can be enhanced.

In another aspect of the present invention, a first recessed part (42) which is one of the recessed parts (40, 42) of the bracket (20) comprises a plate-like projection part (24c) projecting toward the vehicle inward side, a connector connection port (14c) which the detection sensor (14) comprises is placed on the vehicle outward side with respect to the first recessed part (42) in a visible manner from the vehicle inward side via the first recessed part (42), the inner panel is a cowl side panel (18), each being placed at both sides of a cowl (32) extending in a vehicle width direction, and an outlet (30a) for draining water from the cowl (32) is provided at the inner panel (18) at a position diagonally above the connector connection port (14c), and the projection part (24c) of the first recessed part (42) intersects with a first virtual line (L2) connecting the outlet (30a) and the connector connection port (14c).

To the connector connection port of the detection sensor, a predetermined connector (for example, a connector for supplying electricity) is connected. This connecting work is conducted after the detection sensor is fixed to the bracket as well as before the bracket is fixed to the fender panel. In another aspect of the present invention, the connector connection port is placed on the vehicle outward side with respect to the first recessed part of the bracket in a visible manner from the vehicle inward side via this first recessed part. Therefore, it becomes possible to easily determine, via the first recessed part, whether or not the connector is properly connected to the connector connection port, and thereby workability of the connecting work is enhanced.

However, when the first recessed part is provided at the bracket, there is a possibility that reliability of a connecting state after the connector is connected is degraded. That is, at the inner panel (the cowl side panel), the outlet for draining water from the cowl is provided at a position diagonally above the connector connection port. Therefore, the water from the outlet flows down to a connected part of the connector via the first recessed part, degrading the reliability of the connecting state after the connector is connected.

Thus, in another aspect of the present invention, the first recessed part comprises the plate-like projection part projecting toward the vehicle inward side. This projection part intersects with the first virtual line connecting the outlet and the connector connection port. Therefore, the water from the outlet flows down to the projection part, preventing the connected part of the connector from getting wet. Hence, according to another aspect of the present invention, enhancement of the workability of the connecting work of the connector and prevention of the connected part of the connector from getting wet can be both realized.

In another aspect of the present invention, the fender-panel-fixed-surface (22a) of the first wall part (22) of the bracket (20) includes a plurality of embedded ports (54a, 54b, 54c, 54d) into which first fastening members (52a, 52b, 52c, 52d) have been embedded, each of the plurality of embedded ports (54a, 54b, 54c, 54d) is placed symmetrically with respect to a second virtual line (L1) passing through a center of the opening part (22b) of the first wall part (22) in a width direction as well as perpendicular to this width direction, the fender panel (10) includes a plurality of insert-though holes (13a, 13b, 13c, 13d) at corresponding positions to the plurality of embedded ports (54a, 54b, 54c, 54d), the plurality of insert-through holes being holes though which second fastening members (50a, 50b, 50c, 50d) capable of being fastened to the corresponding first fastening members (52a, 52b, 52c, 52d) are to be inserted, the bracket (20) is fixed to the fender panel (10) by each of the second fastening members (50a, 50b, 50c, 50d) is fastened to each of corresponding the first fastening members (52a, 52b, 52c, 52d) via each of corresponding the plurality of insert-through holes (13a, 13b, 13c, 13d), and an angle formed by the fender-panel-fixed-surface (22a) and the detection-sensor-fixed-surface (24a) is kept constant in the width direction of the bracket (20).

The fender panel includes a left side fender panel constituting a part of a left side lateral surface of the vehicle body and a right side fender panel constituting a part of a right side lateral surface of the vehicle body. Thus, it is normally required to separately manufacture each of a left side bracket to be fixed to the left side fender panel and a right side bracket to be fixed to the right side fender panel. In contrast, according to one aspect of the present invention, the embedded ports embedded into the fender-panel-fixed-surface of the bracket are placed symmetrically with respect to the second virtual line as well as the angle formed by the fender-panel-fixed-surface and the detection-sensor-fixed-surface is kept constant in the width direction of the bracket. Hence, the left side bracket can be also used as the right side bracket (vice versa) and thus it becomes unnecessary to manufacture them separately. The bracket is normally manufactured by injection-molding. According to this bracket, there is no need to manufacture a mold for injection-molding separately as a mold for the left side bracket and as a mold for the right side bracket. Therefore, a manufacturing cost of the mold can be significantly reduced.

A bracket (20) according to the present invention is capable of holding a detection sensor (14) comprising a detection part (14a) capable of detecting surrounding information, and capable of being fixed to a fender panel (10) of a vehicle under a state where this detection sensor (14) is being fixed to.

This bracket (20) comprises:

a first wall part (22) including a fender-panel-fixed-surface (22a) capable of being fixed to the fender panel (10) on one side thereof, and including an opening part (22b) capable of exposing the detection part (14a) of the detection sensor (14);

a second wall part (24) placed on an other side with respect to the first wall part (22) in such a manner that the second wall part (24) opposes the first wall part (22), capable of covering a surface (14d) on the other side of the detection sensor (14), including a detection-sensor-fixed-surface (24a), capable of the detection sensor (14) being fixed thereto, on the one side thereof, and including an inner-panel-opposing-surface (24b) on the other side thereof, the inner-panel-opposing-surface (24b) being capable of opposing an inner panel (18) placed on the other side with respect to the fender panel (10) in such a manner that the inner panel (18) opposes the fender panel (10); and a connection part (26) connecting the first wall part (22) and the second wall part (24), wherein, the second wall part (24) comprises recessed parts (40, 42) at both sides in a width direction thereof, each of which being recessed from the inner-panel-opposing-surface (24b) toward the detection-sensor-fixed-surface (24a).

According to this bracket, the worker's hand comes to hardly interfere with the inner panel when conducting the fixing work. Hence, workability when conducting the fixing work can be enhanced.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

Figure 1A:
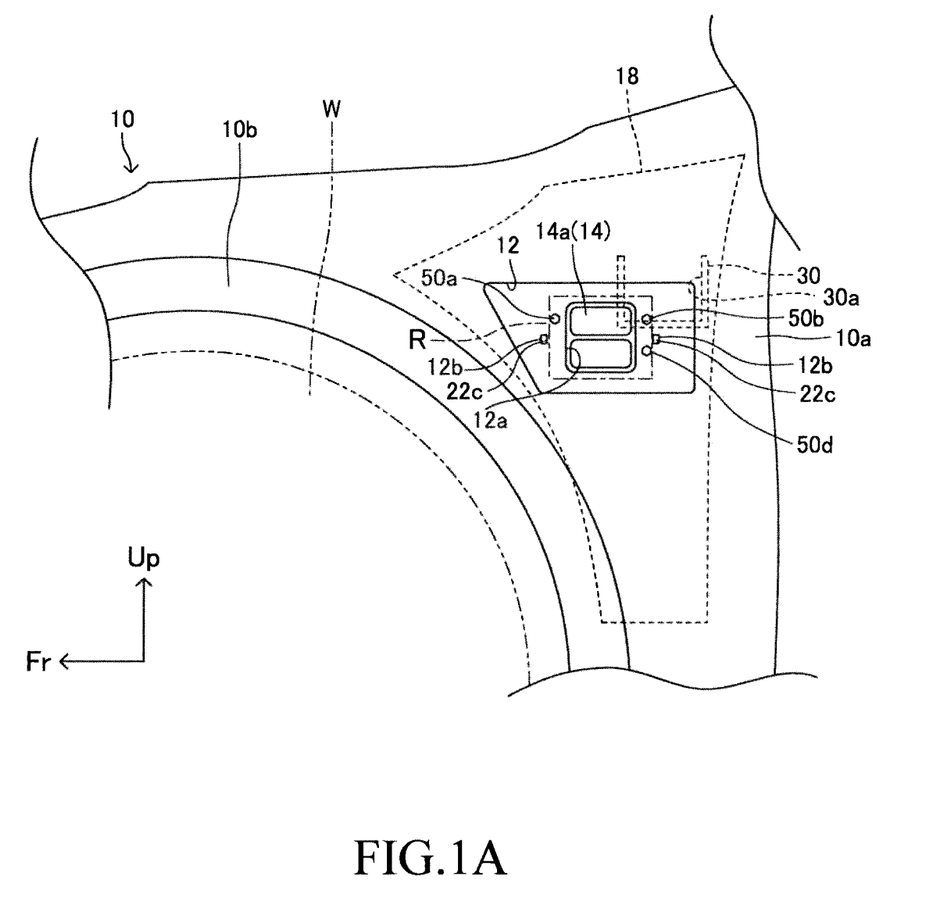
FIG. 1A is a diagram of a left side mounting structure with respect to a vehicle front-rear axis (hereinafter, also simply referred to as a "left side mounting structure") among mounting structure of vehicle-use detection sensor according to an embodiment of the present invention when viewed from a vehicle width outward side.
Figure 2:
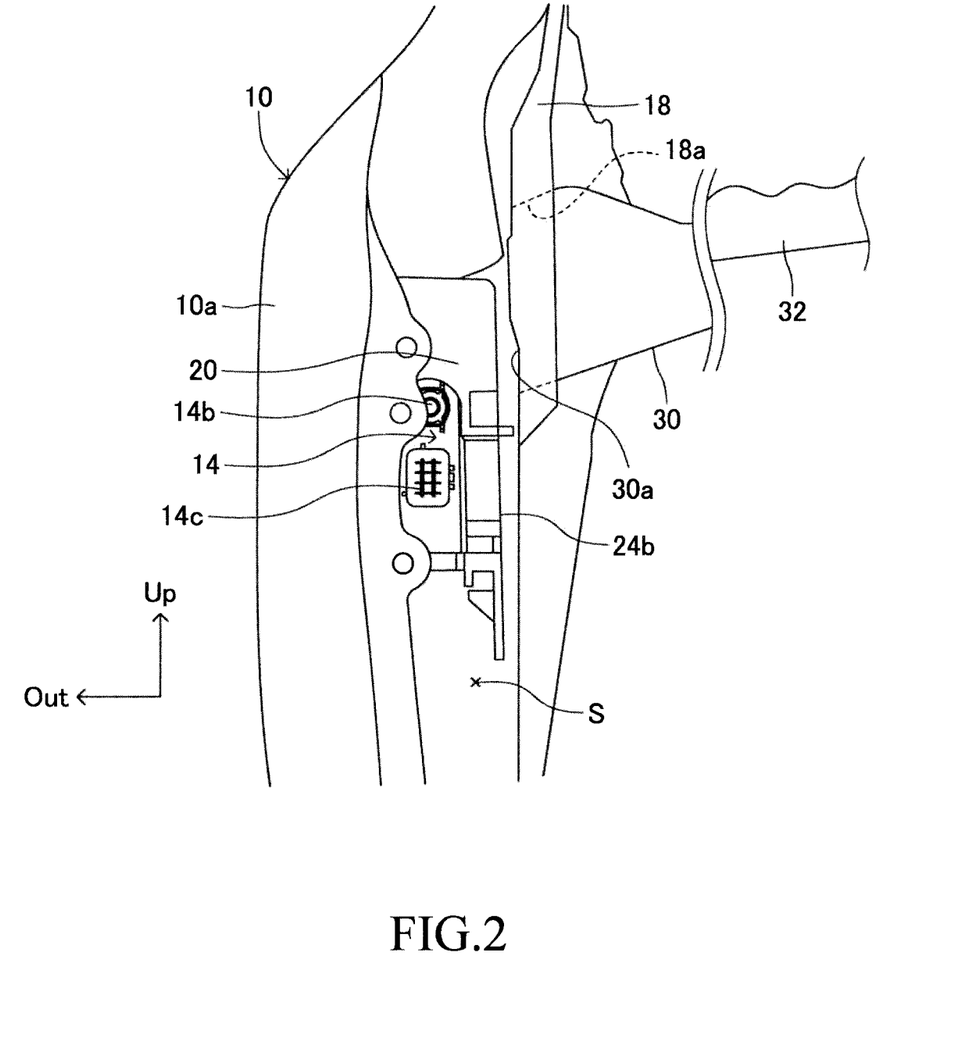
FIG. 2 is a diagram of the left side mounting structure when viewed from a vehicle rear side.

A mounting structure of a vehicle-use detection sensor illustrated in FIG. 1A and FIG. 2 is a left side mounting structure with respect to a vehicle longitudinal/front-rear axis. This mounting structure comprises a fender panel 10, a cowl side panel 18, a detection sensor 14, and a bracket 20. The fender panel 10 constitutes a front part of a left lateral surface of a vehicle body and extends in a vehicle front-rear direction. Illustration of the fender panel 10 is partially omitted. Besides, illustration of other panels constituting the vehicle body adjacent to the fender panel 10 are omitted as well. It should be noted that in figures, a front and a rear in the vehicle front-rear direction is denoted as "Fr" and "Rr", an upper part in a vehicle vertical direction is denoted as "Up", and an outside in a vehicle width direction is denoted as "Out".

As illustrated in FIG. 1A, the fender panel 10 comprises a relatively flat portion 10a, and a circular arc-shaped portion 10b opposing a part in a circumferential direction of an outer peripheral surface of a left front wheel W of a vehicle. The portion 10a extends in the vehicle vertical direction (refer to FIG. 2). A recessed part 12 is provided at the portion 10a, the recessed part 12 being recessed toward a vehicle width inward side. The recessed part 12 includes an opening part 12a penetrating thereof in the vehicle width direction. The opening part 12a is provided for a purpose of exposing a detection part 14a (described later) of the detection sensor 14 to a vehicle width outward side. The opening part 12a includes hole parts 12b, 12b at both sides thereof in the vehicle front-rear direction, the hole parts 12b, 12b penetrating the recessed part 12 in the vehicle width direction. Each of the hole parts 12b, 12b has a size and a shape allowing each of corresponding claw parts 22c, 22c (described later) of the bracket 22 to be engaged therewith. It should be noted that the vehicle width inward side corresponds to a "vehicle inward side" or an "other side", and the vehicle width outward side corresponds to a "vehicle outward side" or a "one side".

Figure 1B:
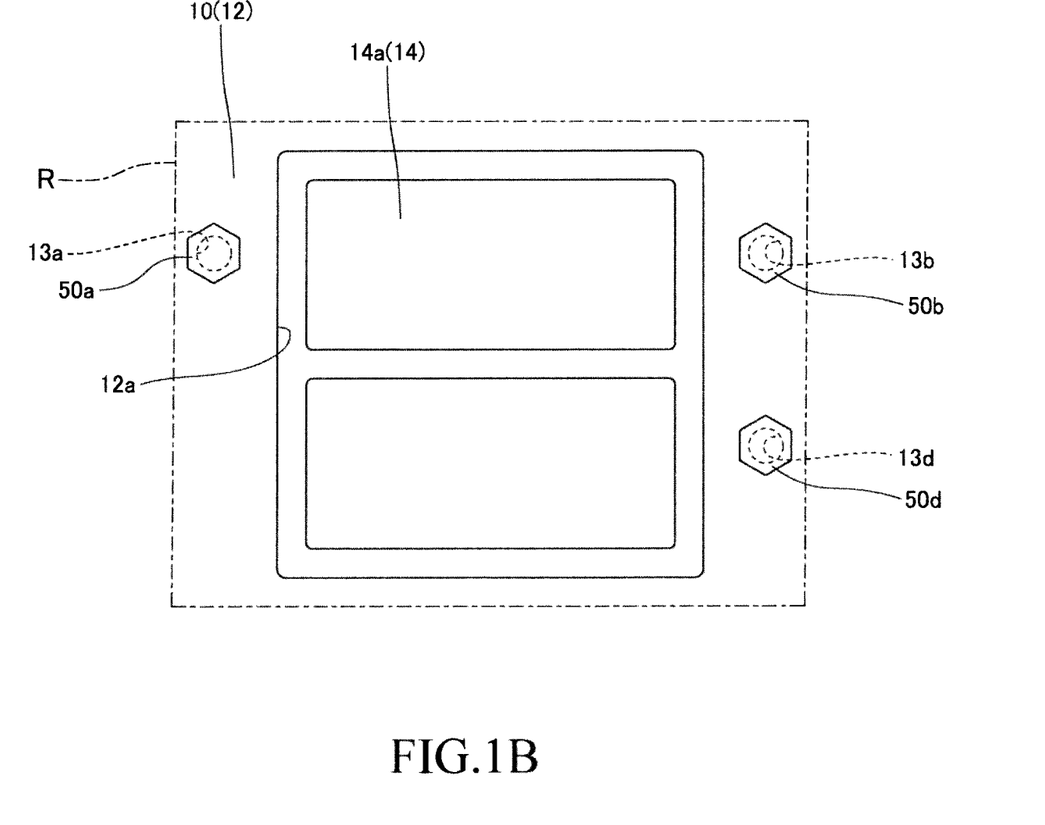
FIG. 1B is a partially magnified diagram of a region R in FIG. 1A.

As illustrated in FIG. 1B, three insert-through holes 13a, 13b, and 13d are provided in a vicinity of the opening part 12a, each of which penetrating the recessed part 12 in the vehicle width direction. The insert-through holes 13a, 13b, and 13d are insert-through holes into which bolts 50a, 50b, and 50d are inserted, the bolts 50a, 50b, and 50d being for fastening the bracket 20 to the fender panel 10 (described later).

As illustrated in FIG. 2, a cowl side panel 18 is placed on the vehicle width inward side with respect to the fender panel 10. The cowl side panel 18 opposes a rear part of the fender panel 10 (refer to a dashed line 1 in FIG. 1A). The cowl side panel 18 is a plate-shaped member extending in the vehicle front-rear direction and in the vehicle vertical direction. A space S is formed on the vehicle width inward side with respect to the fender panel 10 as well as on the vehicle width outward side with respect to the cowl side panel 18. It should be noted that the cowl side panel 18 corresponds to one example of an "inner panel".

The cowl side panel 18 is placed on the vehicle width outward side with respect to a cowl 32. The cowl 32 is a member extending in the vehicle width direction underneath a front glass (illustration omitted) of the vehicle. When cutting the cowl 32 at an arbitrary position thereof with a plane perpendicular to the vehicle width direction, the cowl 32 has a substantially U-shaped cross-sectional form opened upward. The cowl side panel 18 and the cowl 32 are connected to each other via a drain member 30.

Specifically, a through hole 18a is provided at the cowl side panel 18, the through hole 18a penetrating the cowl side panel 18 in a diagonal direction (in more detail, in a descending direction toward an outside in the vehicle width direction). An edge part of the drain member 30 on the vehicle width outward side is inserted into the through hole 18a to be joined with the cowl side panel 18 and to be open toward the space S. The drain member 30 is descending toward the vehicle width outward side (that is, an inner peripheral surface thereof is descending toward the vehicle width outward side as well). When cutting the drain member 30 at an arbitrary position thereof with a plane perpendicular to the vehicle width direction, the drain member 30 has a substantially U-shaped cross-sectional form opened upward (refer to a dashed line 30 in FIG. 1A). An edge part of the drain member 30 on the vehicle width inward side is joined to an edge part of the cowl 32 on the vehicle width outward side (Illustration of a joined part is omitted.). With this configuration, water in the cowl 32 flows through the drain member 30 toward the vehicle width outward side to be drained from the space S. That is, an opening part of the drain member 30 on the vehicle width outward side functions as an outlet. Hereinafter, this opening part will be referred to as an "outlet 30a". The outlet 30a can be said to be provided at the cowl side panel 18.

Figure 3A:
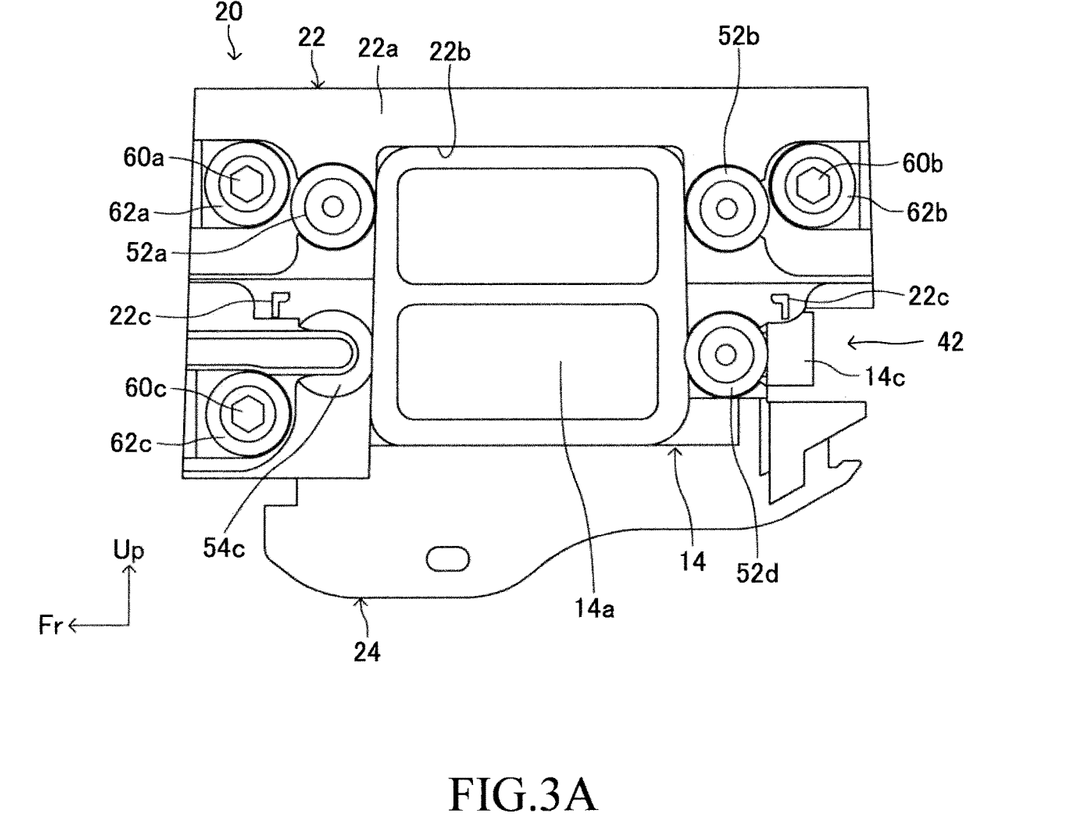
FIG. 3A is a front view of a bracket to which a detection sensor is being fixed, the bracket being to be fixed to a left side fender panel.
Figure 3B:
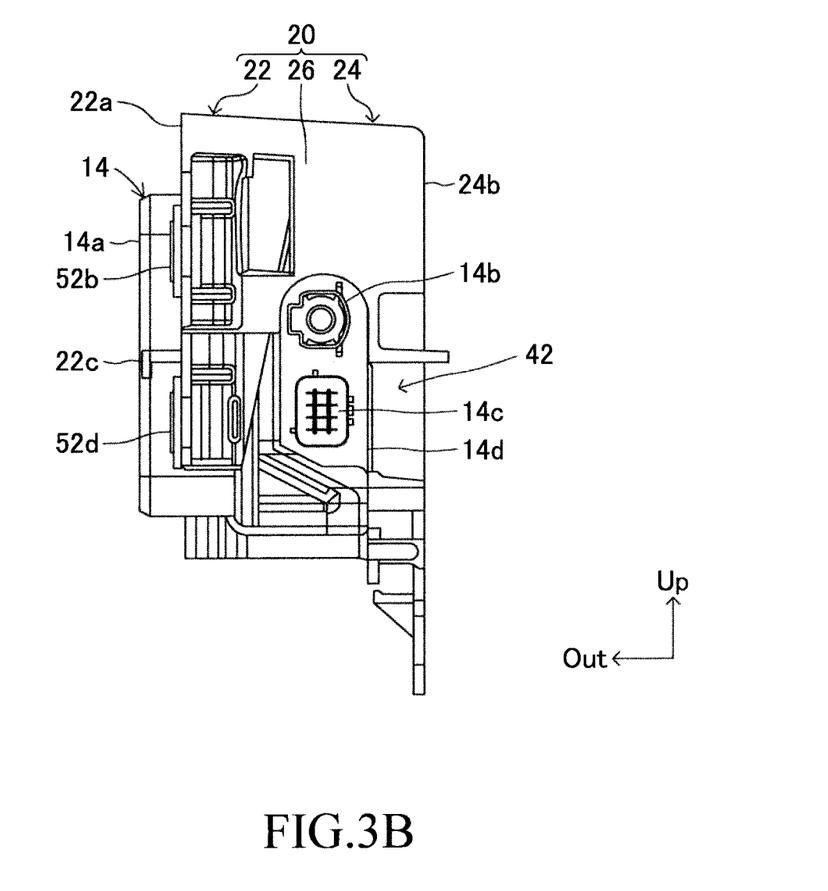
FIG. 3B is a lateral view of the bracket in FIG. 3A.

As shown in FIG. 2, the detection sensor 14 is placed in the space S. As shown in FIG. 3A and FIG. 3B, the detection sensor 14 has a substantially rectangular parallelepiped shape and is held by (fixed to) the bracket 20. Three insert-through holes (illustration omitted), each of which allows each bolt 60a, 60b, and 60c (mentioned later) to be inserted into, are provided at the detection sensor 14 in corresponding positions to the bolts 60a, 60b, and 60c. The bolts 60a, 60b, and 60c are provided for a purpose of fixing the detection sensor 14 to the bracket 20 by fastening thereof. It should be noted that although FIG. 3A and FIG. 3B illustrate the detection sensor 14 and the bracket 20 before being fixed to the fender panel 10, when describing about these FIG. 3A and FIG. 3B, directions in a state of their being fixed to the fender panel 10 will be used for a convenience sake. Same thing can be said for FIG. 4A to FIG. 6B. The detection sensor 14 comprises a detection part 14a for detecting surrounding information, a connection port 14b and a connection port 14c, each of which is for connecting a corresponding connecter thereto. The connection port 14b and the connection port 14c are placed side by side in a vehicle vertical direction.

In the present embodiment, a LIDAR (Light Detection and Ranging/Laser Imaging Detection and Ranging) is used as the detection sensor 14. That is, the detection part 14a functions as a light emitting part for emitting pulse-like laser beams as well as a light receiving part for receiving the laser beams (scattered light) reflected at a target object. The detection sensor 14 is placed in the space S in such a manner that the detection part 14a thereof is exposed to the vehicle width outward side (in other words, a vehicle left lateral side) via the opening part 12a of the fender panel 10. The connection port 14b is a connection port to which an ECU connector (illustration omitted) is to be connected, the ECU connector being for transmitting information detected by the detection sensor 14 to ECU (illustration omitted). Although the ECU connector has been actually connected to the connection port 14b in advance before the detection sensor 14 is placed in the space S, illustration thereof is omitted for a simplification purpose. The connection port 14c is a connection port to which a connector 70 (refer to FIG. 8 and FIG. 9) is to be connected, the connector 70 being for supplying the detection sensor 14 with electricity. The connection ports 14b, 14c are provided on/at a surface substantially perpendicular to a surface on/at which the detection part 14a is provided. When the detection sensor 14 is placed in the space S, the connection ports 14b, 14c come to positions on a rear side in the vehicle front-rear direction (refer to FIG. 2).

Although a detailed description will be made later, the bracket 20 is used both for a left side mounting structure and a right side mounting structure with respect to the vehicle front-rear axis. Thus, in the right side mounting structure, when the detection sensor 14 is placed in the space S, the connection ports 14b, 14c come to positions on a front side in the vehicle front-rear direction (illustration omitted).

Besides, a visible light camera, a millimeter wave radar, or a ultrasonic sensor may be used as the detection sensor 14. When the visible light camera is used, the detection part 14a functions as a light receiving part of visible light. When the millimeter wave radar is used, the detection part 14a functions as a transmitting part and a receiving part of radio/electric wave. When the ultrasonic sensor is used, the detection part 14a functions as a transmitting part and a receiving part of ultrasonic wave.

Figure 4A:
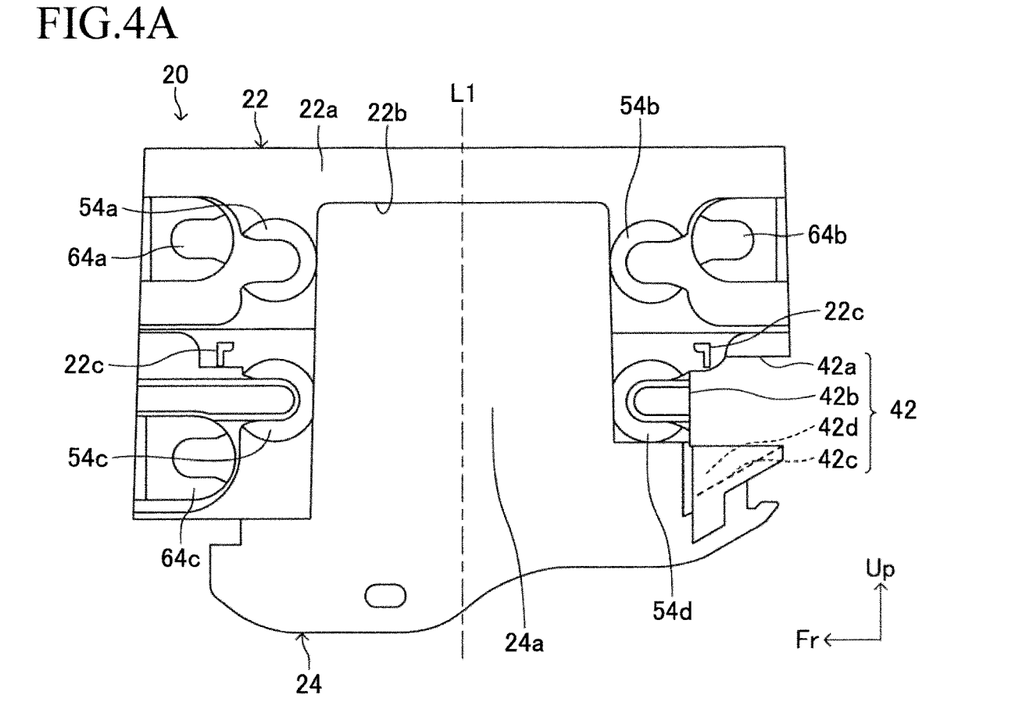
FIG. 4A is a front view of a bracket.
Figure 4B:
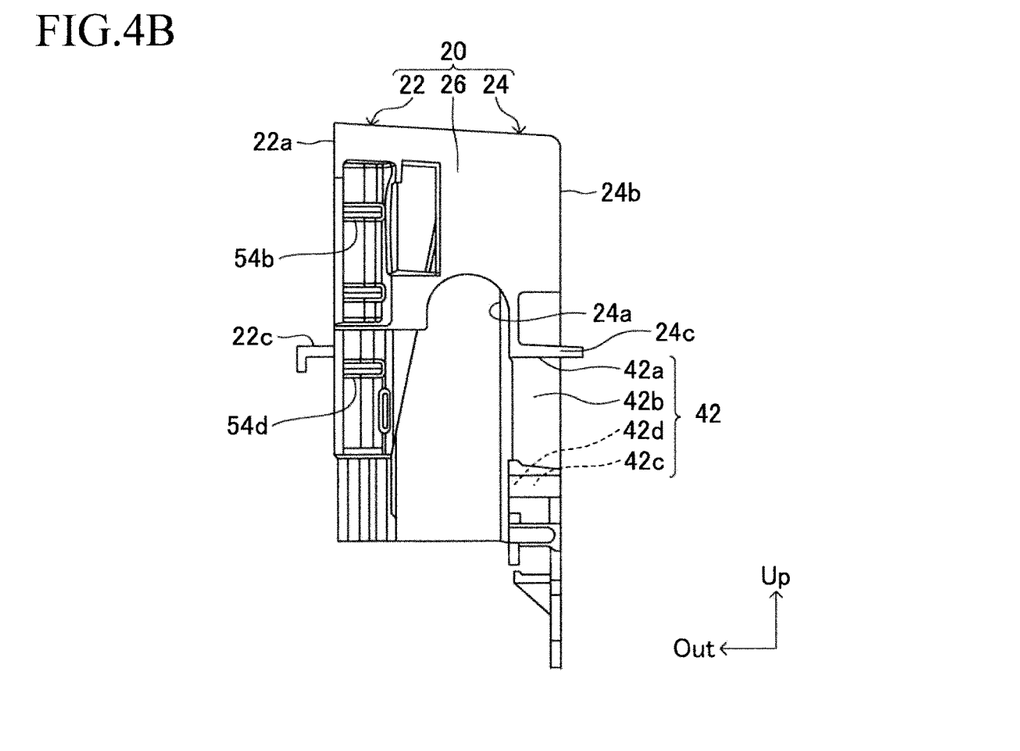
FIG. 4B is a lateral view of the bracket.

As shown in FIG. 2, in the space S, the bracket 20 is placed, holding the detection sensor 14. As shown in FIG. 4A and FIG. 4B, the bracket 20 comprises a first wall part 22, a second wall part 24, and a connection part 26.

The first wall part 22 is a plate-like member expanding in the vehicle front-rear direction and in the vehicle vertical direction, and includes a surface 22a on the vehicle width outward side. The surface 22a is a surface to be fixed to a surface on the vehicle width inward side of the fender panel 10 (described later). The first wall part 22 includes an opening part 22b at a substantially center position thereof in a front view (that is, when viewed from the vehicle width outward side), the opening part 22b penetrating the first wall part 22 in the vehicle width direction. The opening part 22b is opened so as to expose the detection part 14a of the detection sensor 14 to the vehicle width outward side. Two claw parts 22c, 22c are provided on the surface 22a at both sides of the opening part 22b in a width direction (in other words, in the vehicle front-rear direction). An interval between the claw parts 22c, 22c in the width direction is substantially equal to an interval between the hole parts 12b, 12b in the vehicle front-rear direction provided at the recessed part 12 of the fender panel 10. When the claw parts 22c, 22c are engaged with the hole parts 12b, 12b, the bracket 20 (strictly, the bracket 20 holding the detection sensor 14) comes to be temporarily held by the fender panel 10 (described later). The surface 22a corresponds to one example of a "fender-panel-fixed-surface".

The second wall part 24 is a plate-like member expanding in the vehicle front-rear direction and in the vehicle vertical direction, and is placed on the vehicle width inward side with respect to the first wall part 22 so as to oppose the first wall part 22 (refer to FIG. 4B). The second wall part 24 is provided for covering a surface 14d (refer to FIG. 3B) on the vehicle width inward side of the detection sensor 14. The second wall part 24 includes a surface 24a on the vehicle width outward side and includes a surface 24b on the vehicle width inward side. The surface 24a is a surface to which the detection sensor 14 is to be fixed (mentioned later). The surface 24a is parallel to the surface 22a of the first wall part 22. The surface 24b is a surface to be opposed to the cowl side panel 18 when the bracket 20 is fixed to the fender panel 10 (refer to FIG. 2). The surface 24a and the surface 24b correspond to one example of a "detection-sensor-fixed-surface" and an "inner-panel-opposing-surface", respectively.

As shown in FIG. 4A to FIG. 5B, a recessed part 40 (refer to FIG. 5A and FIG. 5B) and a recessed part 42 are each provided at the second wall part 24 on the front side and on the rear side in the vehicle front-rear direction.

Figure 5A:
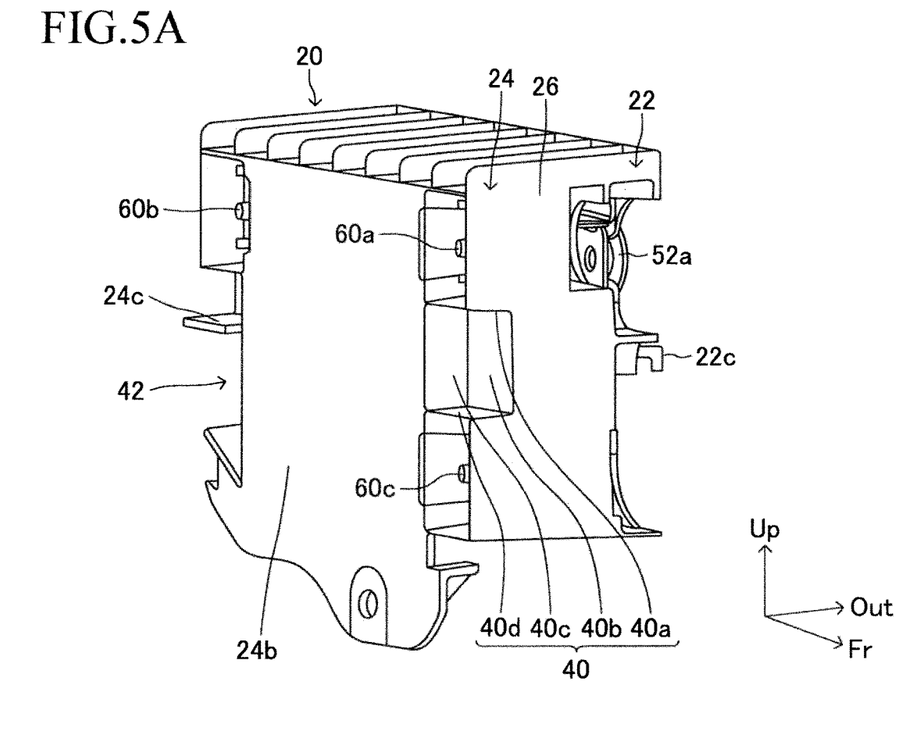
FIG. 5A is a diagram of a back side surface and one lateral surface of the bracket in FIG. 3A when viewed from a diagonal direction.
Figure 5B:
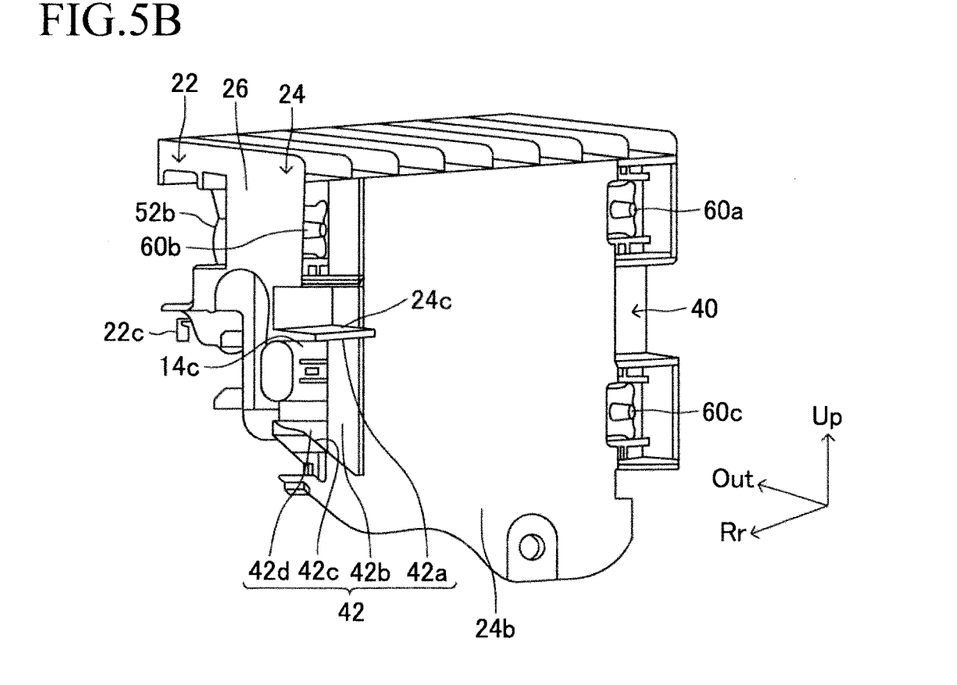
FIG. 5B is a diagram of a back side surface and an other lateral surface of the bracket in FIG. 3A when viewed from a diagonal direction.

The recessed part 40 has a shape where a part on the vehicle front side and a substantially middle part in the vehicle vertical direction, both of which are out of the surface 24b of the second wall part 24, are recessed toward the vehicle width outward side (in other words, toward the surface 24a). The recessed part 40 is comprised of surfaces 40a, 40b, 40c, and 40d. The surface 40a is positioned on a plane expanding in the vehicle width direction and in the vehicle front-rear direction. The surface 40d opposes the surface 40a. The surface 40b is positioned on a plane expanding in the vehicle vertical direction and in the vehicle front-rear direction, connecting the surface 40a and the surface 40d. The surface 40c is positioned on a plane expanding in the vehicle width direction and in the vehicle vertical direction, connecting the surface 40a and the surface 40d. The surface 40c intersects with the surface 40b at a substantially right angle. The surfaces 40a, 40b, 40c, and 40d all have substantially rectangular shape. With this configuration, a substantially rectangular parallelepiped shaped space is formed in/at the recessed part 40. The recessed part 40 may be used as a recess into which a worker inserts his/her finger (typically, a thumb) when holding the bracket 20. Thus, the recessed part 40 is formed large enough for a finger to be inserted.

The recessed part 42 has a shape where a part on the vehicle rear side and a lower part in the vehicle vertical direction, both of which are out of the surface 24b of the second wall part 24, are recessed toward the vehicle width outward side (in other words, toward the surface 24a). The recessed part 42 is comprised of surfaces 42a, 42b, 42c, and 42d. The surface 42a is positioned on a plane expanding in the vehicle width direction and in the vehicle front-rear direction. The surface 42b is positioned on a plane expanding in the vehicle width direction and in the vehicle vertical direction, and intersects with the surface 42a at a substantially right angle. The surface 42c is positioned on a plane expanding in the vehicle width direction and in a "descending direction toward the surface 42b", and intersects with the surface 42b so as to form an acute angle. The surface 42d is positioned on a plane expanding in the vehicle width direction and in the vehicle vertical direction, and intersects with the surface 42b at a substantially right angle.

The surfaces 42a, 42b, and 42c all have substantially rectangular shape, and the surface 42d has a substantially right-angled triangle. The surface 42d intersects with the surface 42c at a substantially right angle, while is not connected to the surface 42a. Therefore, the recessed part 42 is communicated with a "space positioned on the vehicle width outward side with respect to the recessed part 42" in the vehicle width direction. Under a state where the detection sensor 14 is held by (fixed to) the bracket 20, the connection port 14c of the detection sensor 14 is positioned on the vehicle width outward side with respect to the recessed part 42. Thereby, the connection port 14c is visible from the vehicle width inward side via the recessed part 42 (refer to FIG. 5B). A substantially rectangular parallelepiped shaped space is formed in/at the recessed part 42. The recessed part 42 may be used as a recess into which the worker inserts his/her finger (typically, a thumb) when holding the bracket 20. Thus, the recessed part 42 is formed large enough for a finger to be inserted. The recessed part 42 corresponds to one example of a "first recessed part", and the connection port 14c corresponds to one example of a "connector connection port".

It should be noted that a shape of each of the recessed parts 40 and 42 is not limited to the above-mentioned shape as long as it has a shape allowing the worker to insert his/her finger into the recessed part 40 or the recessed part 42 so that the worker can hold the bracket 20. For example, the recessed parts 40 and 42 may each have a circular column shape or a rectangular column shape.

As mentioned above, the bracket 20 is used both for the left side mounting structure and the right side mounting structure. When the bracket 20 is used for the left side mounting structure, as shown in FIG. 4A to FIG. 5B, the recessed part 40 comes to a position on the vehicle front side and the recessed part 42 comes to a position on the vehicle rear side. In this case, the worker conducts fixing work to the fender panel 10 by holding the bracket 20 with use of the recessed part 40. That is, the recessed part 42 is not used. On the other hand, when the bracket 20 is used for the right side mounting structure, the recessed part 42 comes to a position on the vehicle front side and the recessed part 40 comes to a position on the vehicle rear side. In this case, the worker conducts the fixing work to the fender panel 10 by holding the bracket 20 with use of the recessed part 42. That is, the recessed part 40 is not used. A description on the fixing work will be described later.

The connection part 26 connects the first wall part 22 and the second wall part 24 in the vehicle width direction. A vehicle upper surface of the bracket 20 is inclined to descend toward the vehicle width inward side (refer to FIG. 4B to FIG. 5B). With this configuration, water flown down to the vehicle upper surface of the bracket 20 from the outlet 30a (refer to FIG. 2) flows through this surface to fall down to a space between the surface 24b of the second wall part 24 and the cowl side panel 18. Thus, the detection sensor 14 (especially, the detection part 14a) is prevented from getting wet by the water flown down to the vehicle upper surface of the bracket 20 flowing toward the vehicle width outward side.

The detection sensor 14 is fixed to the surface 24a of the second wall part 24, and thereby is placed in a space surrounded by the first wall part 22, the second wall part 24, and the connection part 26. Specifically, as shown in FIG. 4A, three embedded ports 64a, 64b, and 64c are provided on the surface 24a of the second wall part 24, into each of which a nut 62a, 62b, and 62c has been embedded (refer to FIG. 6A). When fixing the detection sensor 14 to the bracket 20, place the detection sensor 14, from the opening part 22b of the bracket 20, at a predetermined position of the bracket 20, and then fasten the bolts 60a, 60b, and 60c to the corresponding nuts 62a, 62b, and 62c, respectively, via insert-through holes (illustration omitted) provided at the detection sensor 14. Thereby, the detection sensor 14 is fixed to the bracket 20 (refer to FIG. 3A and FIG. 3B).

After the detection sensor 14 is fixed to the bracket 20, the fixing work for fixing this bracket 20 to the fender panel 10 is subsequently conducted by the worker. It should be noted that into the bracket 20, the nuts 52a, 52b, and 52d or the nuts 52a, 52b, and 52c have been embedded in advance before the detection sensor 14 is fixed. Specifically, as shown in FIG. 4A, four embedded ports 54a, 54b, 54c, and 54d are provided on the surface 22a of the first wall part 22 of the bracket 20. The embedded ports 54a and 54c and the embedded ports 54b and 54d are placed symmetrically with each other with respect to a "virtual line L1 passing through a center of the opening part 22b of the first wall part 22 in the width direction as well as perpendicular to the width direction". The nuts 52a to 52d are embedded into the embedded ports 54a to 54d in two types of patterns. It should be noted that the nuts 52a to 52d correspond to one example of "first fastening members", and the virtual line L1 corresponds to one example of a "second virtual line".

Figure 6A:
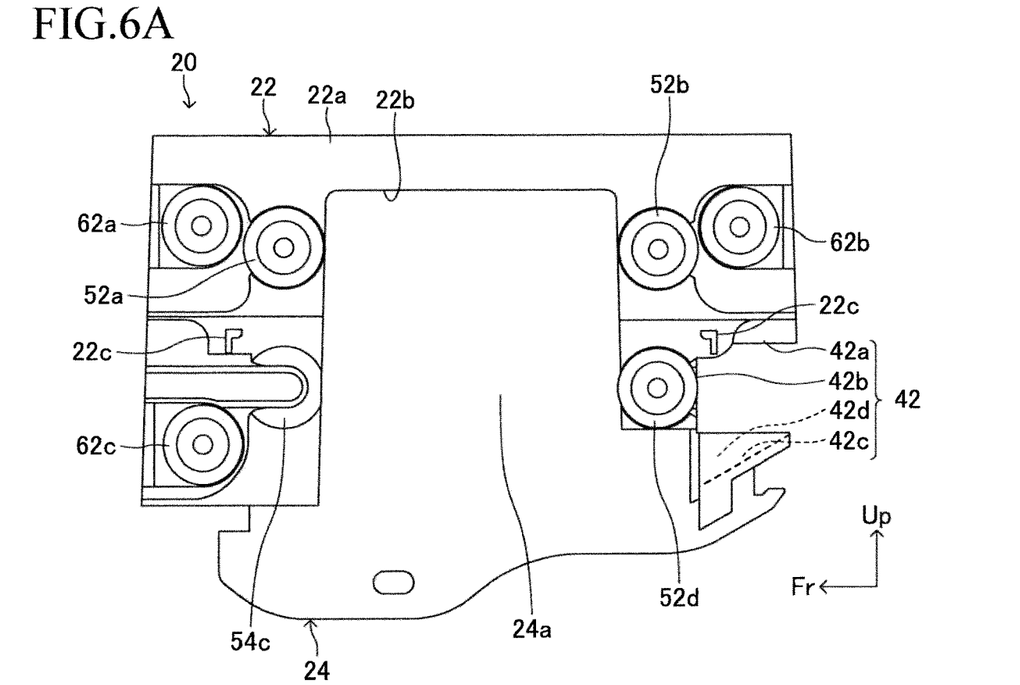
FIG. 6A is a front view of a bracket into which nuts for fastening to a fender panel and nuts for fastening to the detection sensor have been embedded, the bracket being to be used for the left side mounting structure.
Figure 6B:
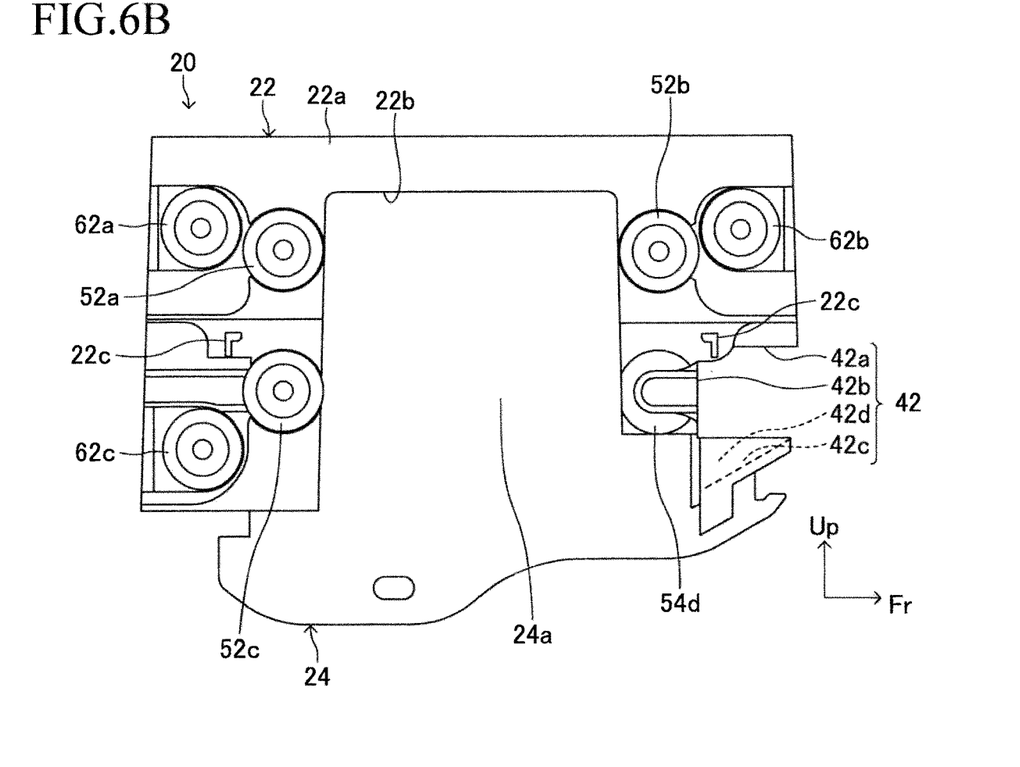
FIG. 6B is a front view of a bracket into which nuts for fastening to a fender panel and nuts for fastening to the detection sensor have been embedded, the bracket being to be used for a right side mounting structure with respect to the vehicle front-rear axis (hereinafter, also simply referred to as a "right side mounting structure").

In the first pattern, as shown in FIG. 4A and FIG. 6A, into the three embedded ports 54a, 54b, and 54d out of the four embedded ports 54a to 54d, the nuts 52a, 52b, and 52d have been embedded. In the second pattern, as shown in FIG. 4A and FIG. 6B, into the three embedded ports 54a, 54b, and 54c out of the four embedded ports 54a to 54d, the nuts 52a, 52b, and 52c have been embedded. A bracket 20 with the first pattern is used for the left side mounting structure (refer to FIG. 3A). A bracket 20 with the second pattern is used for the right side mounting structure.

The fixing work is conducted after the vehicle body is assembled to some extent. Therefore, at a timing when the fixing work is conducted, the cowl side panel 18 has been already placed on the vehicle width inward side of the fender panel 10. Hereinafter, a specific description on the fixing work of the bracket 20 with the first pattern will be made. First, the worker inserts his/her left thumb into the recessed part 40 (refer to FIG. 5A) and supports a lower part of the bracket 20 with remaining left fingers, and thereby hold the bracket 20. Next, the worker moves the bracket 20, holding the bracket 20, from a space beneath the part 10b (refer to FIG. 1A) of the fender panel 10 to the space S (refer to FIG. 2), and engage the claw parts 22c, 22c (refer to FIG. 3A) of the bracket 20 with the hole parts 12b, 12b (refer to FIG. 1A) of the fender panel 10. Thereby, the bracket 20 is temporarily held by the fender panel 10. Subsequently, the worker fastens the bolts 50a, 50b, and 50d (refer to FIG. 1A and FIG. 1B) to the nuts 52a, 52b, and 52d, respectively via the insert-through holes 13a, 13b, and 13d (refer to FIG. 1B) of the fender panel 10, the insert-through holes 13a, 13b, and 13d each being provided at positions corresponding to the embedded ports 54a, 54b, and 54d of the bracket 20. Thereby, the bracket 20 is fixed to the fender panel 10 (refer to FIG. 2). Thereafter, a non-illustrated cover is attached to the fender panel 10 from the vehicle width outward side so as to cover the recessed part 12. It should be noted that the cover includes an opening part at a position corresponding to the detection part 14a of the detection sensor 14, enabling the detection part 14a to detect information on the vehicle width outward side (the left lateral side).

Figure 7:
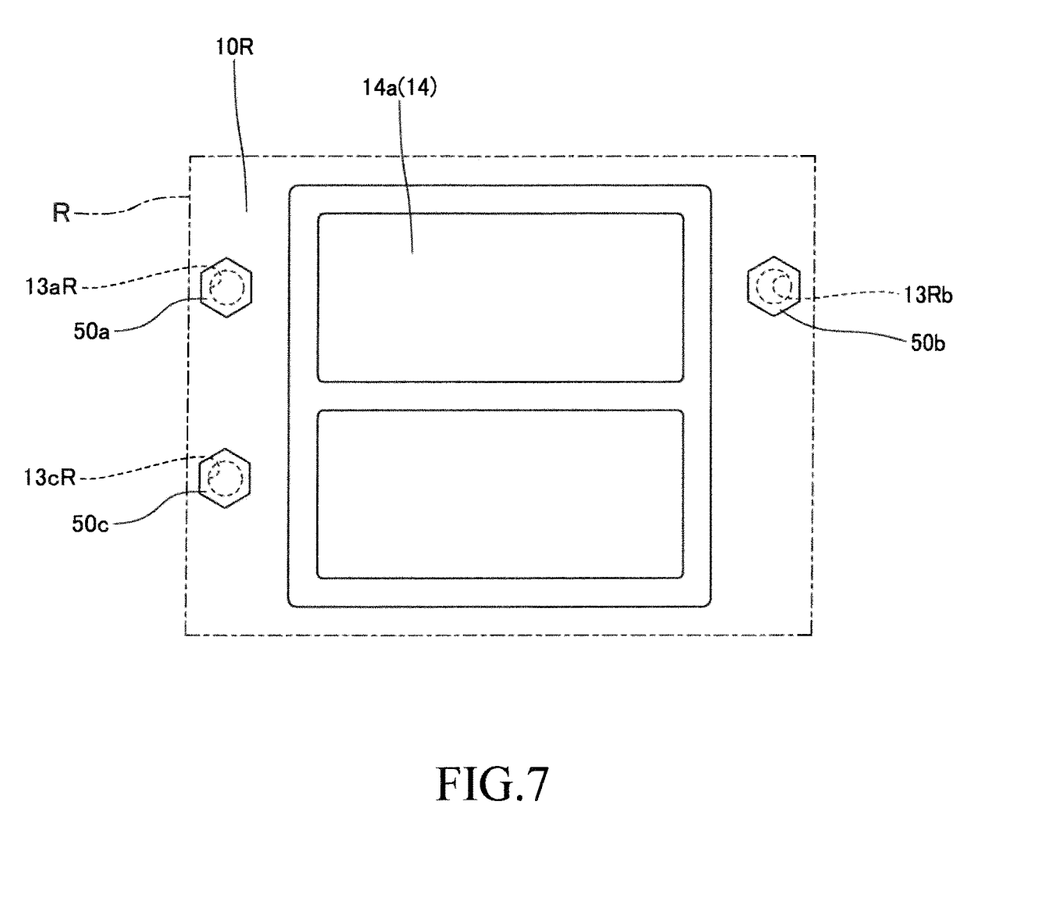
FIG. 7 is a diagram for the right side mounting structure corresponding to FIG. 1B.

On the other hand, when conducting the fixing work of the bracket 20 with the second pattern, the worker inserts his/her right thumb into the recessed part 42 (refer to FIG. 5B) and supports the lower part of the bracket 20 with remaining right fingers, and thereby hold the bracket 20. Next, the worker makes a right side fender panel 10R (refer to FIG. 7) temporarily hold the bracket 20 in the same manner as mentioned above. Subsequently, the worker fastens, as shown in FIG. 7, the bolts 50a, 50b, and 50c to the nuts 52a, 52b, and 52c, respectively via the insert-through holes 13aR, 13bR, and 13cR of the fender panel 10R, the insert-through holes 13aR, 13bR, and 13cR each being provided at positions corresponding to the embedded ports 54a, 54b, and 54c of the bracket 20. Thereby, the bracket 20 is fixed to the fender panel 10R. Thereafter, a non-illustrated cover is attached to the fender panel 10R from the vehicle width outward side in the same manner as mentioned above. It should be noted that the cover includes an opening part at a position corresponding to the detection part 14a of the detection sensor 14, enabling the detection part 14a to detect information on the vehicle width outward side (the right lateral side). The bolts 50a to 50d correspond to one example of "second fastening members".

An opening part (illustration omitted) provided at the right side fender panel 10R has the same size and shape as the opening part 12a provided at the left side fender panel 10, and they are in a positional relationship symmetric with each other with respect to the vehicle front-rear axis. As mentioned above, the surface 22a of the first wall part 22 and the surface 24a of the second wall part 24 are parallel to each other. Besides, the embedded ports 54a to 54d of the surface 22a are placed symmetrically with each other with respect to the virtual line L1. Therefore, the bracket 20 can be used both for the left side mounting structure and the right side mounting structure. Accordingly, a manufacturing cost of a mold for injection-molding of the bracket 20 can be significantly reduced (approximately by one half, for example). In addition, by embedding the nuts 52a to 52d in two types of patterns, it becomes possible to easily determine, based on each of the embedded patterns (that is, based on the positions where the nuts 52a to 52d have been embedded), which mounting structure (the left side or the right side) a certain arbitrary bracket 20 will be used for. It should be noted that the surface 22a and the surface 24a are not necessarily parallel. As long as an angle formed by the surface 22a and the surface 24a is kept constant in the width direction (in the present embodiment, in the vehicle front-rear direction), the bracket 20 can be used both for the left side and the right side mounting structures. Here, the "angle formed by the surface 22a and the surface 24a" means an angle formed by a plane including the surface 22a and a plane including the surface 24a. That is, the surface 22a does not have to intersect with the surface 24a.

Figure 8:
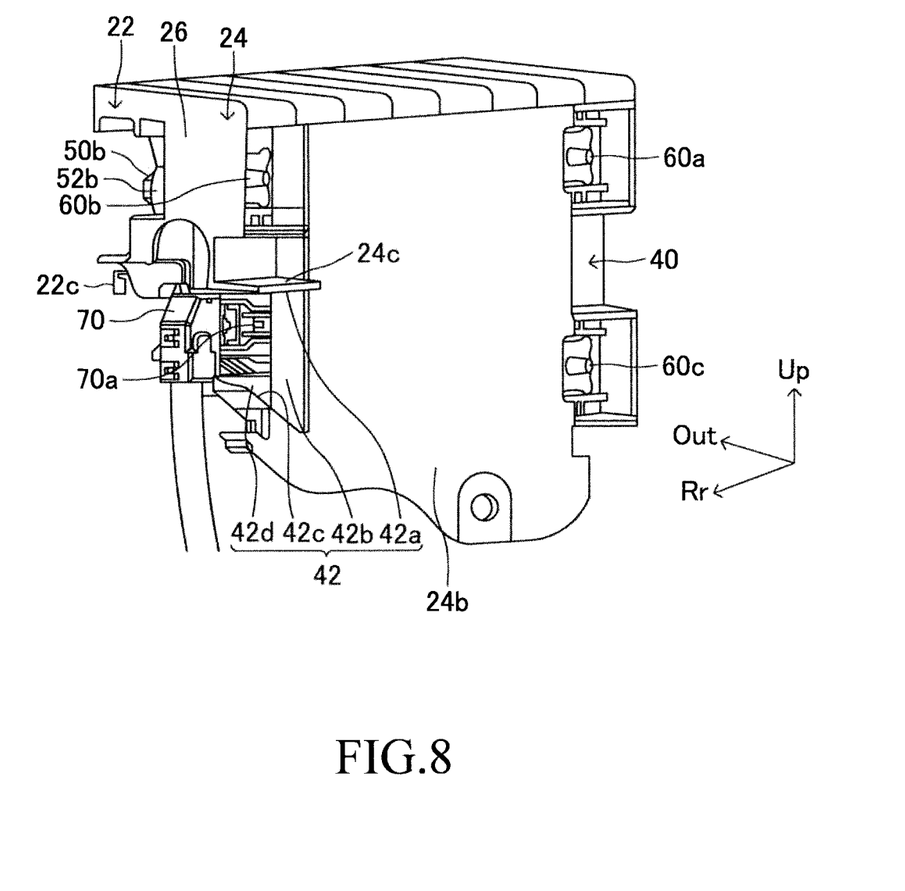
FIG. 8 is a diagram of the detection sensor and the bracket in the left side mounting structure when viewed from the vehicle rear side as well as a vehicle width inward side, illustrating a state where a connector has been connected to the detection sensor.

The fixing work is actually conducted after connecting the connector 70 to the connection port 14c of the detection sensor 14. As shown in FIG. 8, an engaged part 70a of the connection port 14c and the connector 70 is positioned on the vehicle width inward side with respect to the connection port 14c. Thus, by checking a state of the engaged part 70a from the vehicle width inward side via the recessed part 42, it becomes possible to easily determine whether or not the connector 70 is properly connected to the connection port 14c. In this way, the space inside the recessed part 42 for holding the bracket 20 may be made use of as a space for checking a state of the engaged part 70a, and thereby workability of connecting work to connect the connector 70 to the connection port 14c is enhanced.

Figure 9:
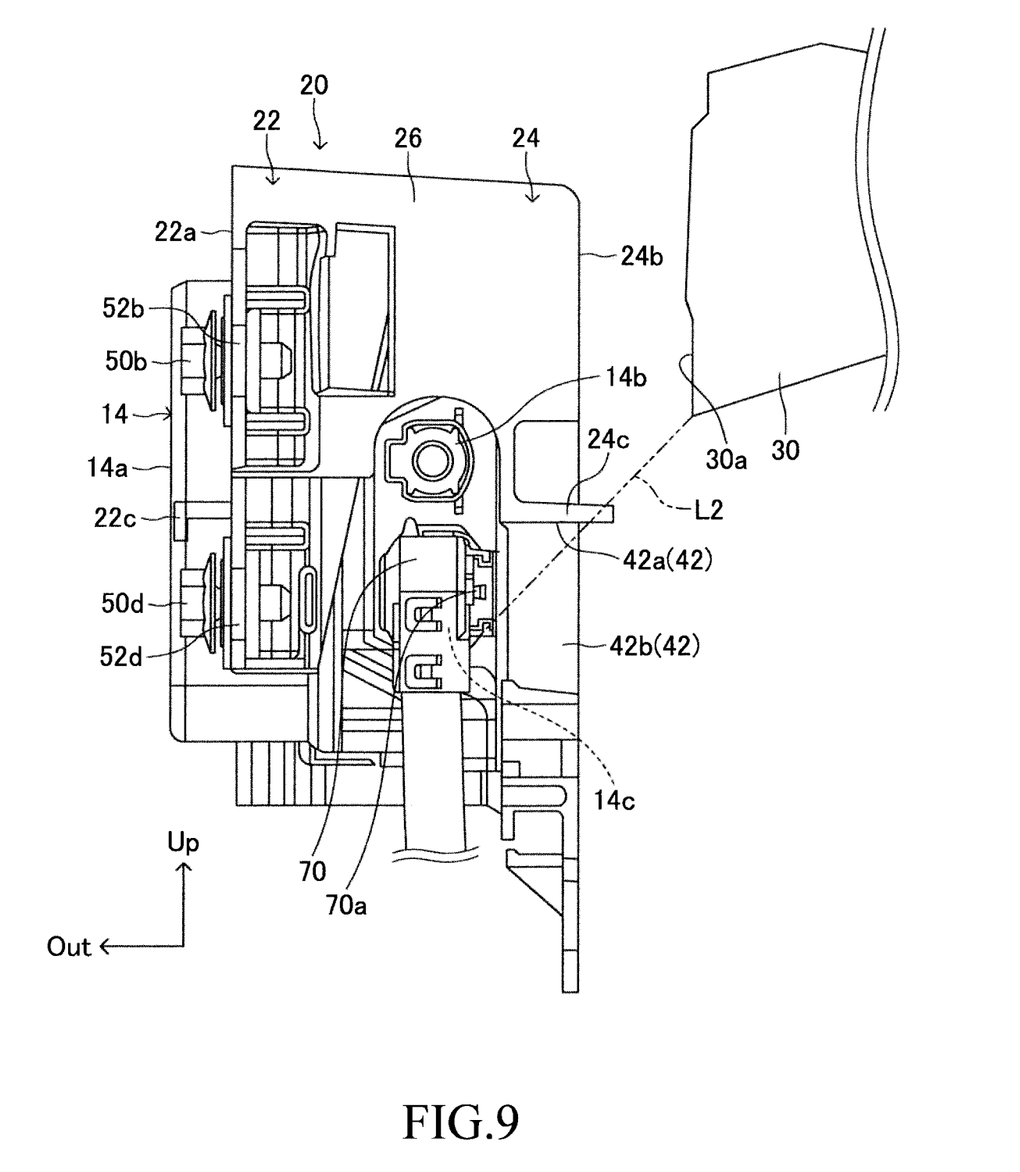
FIG. 9 is a lateral view of the detection sensor and the bracket in FIG. 8 and used to describe a positional relationship between an outlet of a drain member, a projection part, and a connector connection port.

However, as shown in FIG. 2 and FIG. 9, the outlet 30a is positioned diagonally above the connection port 14c, and thus there is a possibility that the water from the outlet 30a flows down to the connector 70 (especially, a connected part to the connection port 14c) via the recessed part 42, degrading reliability of a connecting state after the connector 70 is connected.

Thus, as shown in FIG. 4B to FIG. 5B, a plate-like projection part 24c projecting toward the vehicle width inward side is provided at the recessed part 42. The projection part 24c extends relatively long toward the vehicle width inward side, and a tip end thereof is positioned on the vehicle width inward side with respect to the surface 24b of the second wall part 24. Specifically, as shown in FIG. 9, the projection part 24c is formed to have an enough length to intersect with a virtual line L2 connecting the outlet 30a and the connection port 14c (refer to a dashed line 14c in FIG. 9). With this configuration, the water from the outlet 30a flows down to an upper surface of the projection part 24c, preventing the connected part of the connector 70 from getting wet. That is, the projection part 24c serves as a hood/roof for preventing the connected part of the connector 70 from getting wet. With the recessed part 42 comprising the projection part 24c, enhancement of the workability of the connecting work of the connector 70 and prevention of the connected part of the connector 70 from getting wet can be both realized. The virtual line L2 corresponds to one example of a "first virtual line". It should be noted that a surface 42a which is one of the surfaces constituting the recessed part 42 is a lower surface of the projection part 24c (strictly, out of the lower surface of the projection part 24c, a part opposing the surface 42c is the surface 42a).

Effects of the mounting structure of the vehicle-use detection sensor according to the present embodiment will be described. The bracket 20 used for this mounting structure comprises the recessed part 40 and the recessed part 42 on the vehicle front side thereof and on the vehicle rear side thereof, respectively. The worker inserts his/her thumb into one of the recessed part 40 or the recessed part 42 (typically, a recessed part to be positioned on the vehicle front side after the fixing work) and supports the lower part of the bracket 20 with the remaining fingers, and thereby the worker can hold the bracket 20. Thus, compared to other ways of holding the bracket 20, a worker's hand comes to hardly interfere with the cowl side panel 18 when conducting the fixing work. Hence, workability when conducting the fixing work can be enhanced.

The mounting structure of the vehicle-use detection sensor and the bracket according to the present embodiment has been described. However, the present invention is not limited thereto and may adopt various modifications within a scope of the present invention.

For example, the mounting structure described above may be applied to a mounting structure of a detection sensor provided at a fender panel constituting a rear part of the lateral surface of the vehicle body.

Alternatively, the bracket 20 may be fixed to a panel other than the fender panel 10 (10R) constituting the vehicle body. In addition, the space S may be a space formed between with an inner panel other than the cowl side panel 18.

The invention claimed is:

1. A mounting structure of a vehicle-use detection sensor comprising:
    a fender panel constituting a part of a lateral surface of a vehicle body;
    an inner panel placed on a vehicle inward side with respect to said fender panel in such a manner that said inner panel opposes said fender panel;
    a detection sensor placed in a space formed on said vehicle inward side with respect to said fender panel as well as on a vehicle outward side with respect to said inner panel and comprising a detection part capable of detecting surrounding information, said detection part being exposed to a vehicle lateral side via an opening part provided at said fender panel; and a bracket placed in said space, holding said detection sensor, and fixed to said fender panel, wherein, said bracket comprises:

a first wall part including a fender-panel-fixed-surface on said vehicle outward side thereof, said fender-panel-fixed-surface being to be fixed to said fender panel, and including an opening part for exposing said detection part of said detection sensor to said vehicle lateral side;

a second wall part placed on said vehicle inward side with respect to said first wall part in such a manner that said second wall part opposes said first wall part, covering a surface on said vehicle inward side of said detection sensor, including a detection-sensor-fixed-surface, said detection sensor being to be fixed thereto, on said vehicle outward side thereof, and including an inner-panel-opposing-surface opposing said inner panel on said vehicle inward side thereof; and a connection part connecting said first wall part and said second wall part, and said second wall part comprises a recessed part on a vehicle front side thereof and a recessed part on a vehicle rear side thereof, each of which being recessed from said inner-panel-opposing-surface toward a vehicle outward direction.

2. The mounting structure of the vehicle-use detection sensor according to claim 1, wherein, a first recessed part which is one of said recessed parts of said bracket comprises a plate-like projection part projecting toward said vehicle inward side, a connector connection port which said detection sensor comprises is placed on said vehicle outward side with respect to said first recessed part in a visible manner from said vehicle inward side via said first recessed part, said inner panel is a cowl side panel, each being placed at both sides of a cowl extending in a vehicle width direction, and an outlet for draining water from said cowl is provided at said inner panel at a position diagonally above said connector connection port, and said projection part of said first recessed part intersects with a first virtual line connecting said outlet and said connector connection port.

3. The mounting structure of the vehicle-use detection sensor according to claim 1, wherein, said fender-panel-fixed-surface of said first wall part of said bracket includes a plurality of embedded ports into which first fastening members have been embedded, each of said plurality of embedded ports is placed symmetrically with respect to a second virtual line passing through a center of said opening part of said first wall part in a width direction as well as perpendicular to this width direction, said fender panel includes a plurality of insert-though holes at corresponding positions to said plurality of embedded ports, said plurality of insert-through holes being holes though which second fastening members capable of being fastened to said corresponding first fastening members are to be inserted, said bracket is fixed to said fender panel by each of said second fastening members is fastened to each of corresponding said first fastening members via each of corresponding said plurality of insert-through holes, and an angle formed by said fender-panel-fixed-surface and said detection-sensor-fixed-surface is kept constant in said width direction of said bracket.

4. The mounting structure of the vehicle-use detection sensor according to claim 2, wherein, said fender-panel-fixed-surface of said first wall part of said bracket includes a plurality of embedded ports into which first fastening members have been embedded, each of said plurality of embedded ports is placed symmetrically with respect to a second virtual line passing through a center of said opening part of said first wall part in a width direction as well as perpendicular to this width direction, said fender panel includes a plurality of insert-though holes at corresponding positions to said plurality of embedded ports, said plurality of insert-through holes being holes though which second fastening members capable of being fastened to said corresponding first fastening members are to be inserted, said bracket is fixed to said fender panel by each of said second fastening members is fastened to each of corresponding said first fastening members via each of corresponding said plurality of insert-through holes, and an angle formed by said fender-panel-fixed-surface and said detection-sensor-fixed-surface is kept constant in said width direction of said bracket.

5. A bracket capable of holding a detection sensor comprising a detection part capable of detecting surrounding information, and capable of being fixed to a fender panel of a vehicle under a state where this detection sensor is being fixed to comprising:

a first wall part including a fender-panel-fixed-surface capable of being fixed to said fender panel on one side thereof, and including an opening part capable of exposing said detection part of said detection sensor;

a second wall part placed on an other side with respect to said first wall part in such a manner that said second wall part opposes said first wall part, capable of covering a surface on said other side of said detection sensor, including a detection-sensor-fixed-surface, capable of said detection sensor being fixed thereto, on said one side thereof, and including an inner-panel-opposing-surface on said other side thereof, said inner-panel-opposing-surface being capable of opposing an inner panel placed on said other side with respect to said fender panel in such a manner that said inner panel opposes said fender panel; and a connection part connecting said first wall part and said second wall part, wherein, said second wall part comprises recessed parts at both sides in a width direction thereof, each of which being recessed from said inner-panel-opposing-surface toward said detection-sensor-fixed-surface.

* * * * *